US011165781B2

(12) United States Patent
Infante-Lopez et al.

(10) Patent No.: US 11,165,781 B2
(45) Date of Patent: *Nov. 2, 2021

(54) DISTRIBUTED COMMUNICATION BETWEEN INTERNET OF THINGS DEVICES

(71) Applicant: McAfee, LLC, Santa Clara, CA (US)

(72) Inventors: Gabriel G. Infante-Lopez, Cordova (AR); Robert J. Firby, Santa Clara, CA (US)

(73) Assignee: McAfee, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/440,426

(22) Filed: Jun. 13, 2019

(65) Prior Publication Data

US 2019/0297086 A1    Sep. 26, 2019

Related U.S. Application Data

(63) Continuation of application No. 15/196,229, filed on Jun. 29, 2016, now Pat. No. 10,375,079.

(51) Int. Cl.
*H04L 29/06* (2006.01)
*G06N 20/00* (2019.01)
(Continued)

(52) U.S. Cl.
CPC ...... *H04L 63/102* (2013.01); *G06F 16/90335* (2019.01); *G06N 5/022* (2013.01);
(Continued)

(58) Field of Classification Search
CPC ..... H04L 63/083; H04L 41/14; H04L 63/102; H04L 63/0428; G06F 16/90335;
(Continued)

(56) References Cited

U.S. PATENT DOCUMENTS 9,571,906 B2    2/2017  Ghosh et al.
9,699,814 B2    7/2017  Zakaria et al.
(Continued)

OTHER PUBLICATIONS

United States Paten and Trademark Office, "Notice of Allowance", issued in connection with U.S. Appl. No. 15/196,229, dated Mar. 13, 2019, 25 pages.

(Continued)

*Primary Examiner* — Bryan F Wright
(74) *Attorney, Agent, or Firm* — Hanley, Flight & Zimmerman, LLC

(57) ABSTRACT

Technologies for a distributed Internet of Things (IoT) system including a plurality of IoT devices are disclosed. An example IoT device includes an input device to receive an input from a user and a processor to determine if a pattern is recognized in the input. The example IoT device also includes a communication circuit to: in response to a determination that a pattern is not recognized in the input, communicate a first message indicative of the input over a universal bus; and in response to a determination that a pattern is recognized in the input, communicate a second message indicative of the input directly to another IoT device without using the universal bus.

19 Claims, 9 Drawing Sheets

(51) Int. Cl.
  *G06F 16/903* (2019.01)
  *H04W 4/70* (2018.01)
  *G06N 5/02* (2006.01)
  *H04W 4/80* (2018.01)
  *G06N 5/04* (2006.01)

(52) U.S. Cl.
  CPC .............. *G06N 5/047* (2013.01); *G06N 20/00* (2019.01); *H04W 4/70* (2018.02); *H04W 4/80* (2018.02); *H04L 63/0428* (2013.01)

(58) Field of Classification Search
  CPC ......... G06N 20/00; G06N 5/047; H04W 4/70; H04W 4/80
  USPC ............................................................ 726/29
  See application file for complete search history.

(56) References Cited

U.S. PATENT DOCUMENTS

| | | | |
|---|---|---|---|
| 2014/0359131 A1 | 12/2014 | Seed et al. | |
| 2015/0121470 A1* | 4/2015 | Rongo | H04L 63/083 726/4 |
| 2015/0358777 A1 | 12/2015 | Gupta | |
| 2015/0379158 A1 | 12/2015 | Infante-Lopez | |
| 2016/0004871 A1 | 1/2016 | Guedalia et al. | |
| 2016/0093198 A1* | 3/2016 | Tung | G08B 25/016 340/539.11 |
| 2016/0132816 A1 | 5/2016 | Lush | |
| 2016/0198536 A1* | 7/2016 | Britt | H02J 7/00 315/149 |
| 2016/0261465 A1* | 9/2016 | Gupta | H04L 41/14 |
| 2016/0337322 A1 | 11/2016 | Kang et al. | |
| 2016/0342906 A1 | 11/2016 | Shaashua et al. | |
| 2017/0091277 A1 | 3/2017 | Zoch | |
| 2017/0093829 A1 | 3/2017 | Infante-Lopez et al. | |
| 2017/0094592 A1 | 3/2017 | Tabatabaei et al. | |
| 2018/0007055 A1 | 1/2018 | Infante-Lopez et al. | |

OTHER PUBLICATIONS

United States Paten and Trademark Office, "Non-Final Office action", issued in connection with U.S. Appl. No. 15/196,229, dated Jul. 18, 2018, 46 pages.

International Bureau, "International Preliminary Report on Patentability," issued in connection with PCT patent application No. PCT/US2017/039288, dated Jan. 10, 2019, 10 pages.

International Searching Authority, "International Search Report and Written Opinion", issued in connection with International Patent Application No. PCT/US2017/039288, dated Sep. 29, 2017, 13 pages.

Jeon et al., "An Intelligent Dialogue Agent for the IoT Home", Proceedings of the Thirtieth AAAI Conference on Artificial Intelligence, Feb. 13, 2016, 6 pages.

Ben Dickson, "Decentralizing IoT networks through blockchain", TC Sessions, Jun. 28, 2016, 10 pages.

U.S. Appl. No. 14/751,841 by Infante-Lopez.

U.S. Patent Appl. No. 14/865,556 by Infante-Lopez.

European Patent Office, "Communication pursuant to Article 94(3) EPC," issued in connection with EP Patent application No. 17737144.0. dated May 20, 2021, 5 pages.

* cited by examiner

DISTRIBUTED COMMUNICATION BETWEEN INTERNET OF THINGS DEVICES

RELATED APPLICATION

The patent arises as a continuation of U.S. patent application Ser. No. 15/196,229, which was filed on Jun. 29, 2016. Priority is claimed to U.S. patent application Ser. No. 15/196,229. U.S. patent application Ser. No. 15/196,229 is hereby incorporated by reference in its entirety.

BACKGROUND

The Internet of Things (IoT) is a network of physical objects or "things" embedded with electronics, software, sensors, and connectivity to enable greater value and service by exchange of data with the manufacturer, operator, or other connected devices. In many IoT systems, the individual physical objects may have limited or no computational capability (e.g., sensors), but merely send data to and receive instruction from a central server. The development of the IoT may lead to the existence of a great number of devices, potentially each of them sending and receiving information to and from a central server. The use of a central server may, in some circumstances, require significant computational resources, and may also result in privacy and security concerns for the data generated the IoT devices.

SUMMARY OF INVENTION

A first Internet of Things (IoT) device comprising: a memory; and a processor to: determine if a pattern is recognized in an input from a user; in response to a determination that the pattern is not recognized in the input, communicate a first message indicative of the input over a universal bus; and in response to a determination that the pattern is recognized in the input: determine if the first IoT is to perform an action based on the pattern; cause the first IoT device to perform the action to change a physical environment based on a determination from the pattern recognized in the input that the first IoT is to perform the action; determine if additional information is needed for a second IoT device to perform the action; communicate a second message indicative of the input directly to a second IoT device without using the universal bus based on a determination that the first IoT device is not to perform the action and that additional information is not needed to cause the second IoT device to perform the action; and in response to a determination that additional information is needed for the second IoT device to perform the action, communicate a third message over the universal bus to a third IoT device to request the additional information to prompt the third IoT device to send a fourth message to at least one of the first IoT device or the second IoT device based on a privacy setting.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1A:
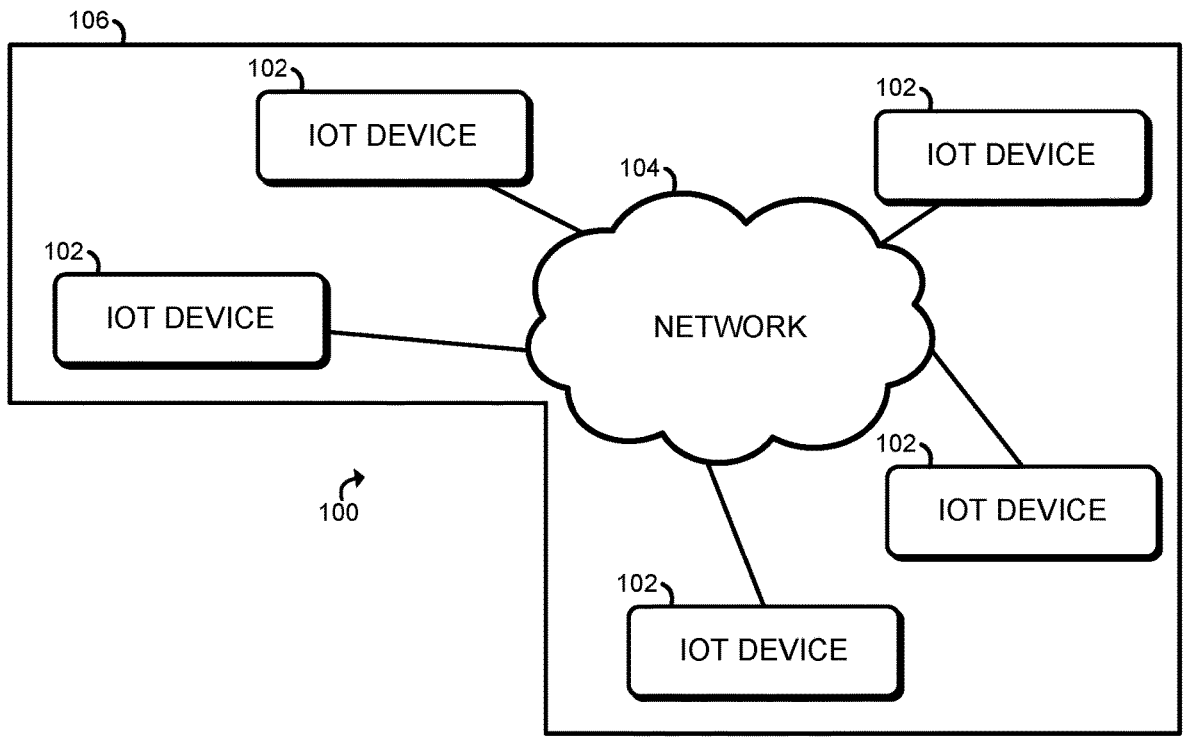
FIGS. 1A & 1B are simplified block diagrams of at least one embodiment of a distributed IoT system.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1A, an illustrative distributed Internet of Things (IoT) system 100 includes several IoT devices 102 connected by a network 104. The distributed IoT system 100 is illustratively deployed in a house 106, but of course the distributed IoT system 100 can be used in other environments as well, such as an office setting, a retail setting, a restaurant setting, a manufacturing setting, an industrial setting, a construction setting, etc. In use and as described in more detail below, each IoT device 102 of the distributed IoT system 100 acts as an independent agent, without relying on a central server. Each IoT device 102 has at least one input or output device (such as a microphone or light switch) as well as a knowledge base, which includes information known to the IoT device 102 such as nearby devices, past input or output received by the IoT device 102, and/or past user commands. Each IoT device 102 may implement reasoning algorithms and/or machine-learning-based algorithms to find correlation between events, determine responses to queries for information, and determine appropriate responses to user input. The distributed knowledge base of the distributed IoT system 100 contained by the various IoT devices 102 allows for the determination of answers to complex queries. In the illustrative distributed IoT system 100, each IoT device 102 is subscribed to a universal bus, allowing each IoT device 102 to easily communicate with each other IoT device 102 when necessary.

For example, in an illustrative use case of the distributed IoT system 100, a user may turn on a series of lights each time the user enters the house 106. Over time, the IoT devices 102 recognize the pattern of what actions the user performs using a machine-learning-based algorithm, and the series of lights may be subsequently turned on automatically when the user enters the house 106.

The network 104 may be implemented with any communication means that enables the IoT devices 102 to communicate with each other. In the illustrative embodiment, the only necessary hardware for the network 104 is the IoT devices 102 themselves, which may be able to communicate with nearby devices through wireless connections such as Wi-Fi® or Bluetooth®. In one example, the network 104 is embodied as a wireless ad-hoc network. It should be appreciated that it is not necessary for each IoT device 102 to be able to directly communicate with each other IoT device 102, since an IoT device 102 may communicate with a desired IoT device 102 with use of one or more intermediate IoT devices 102.

In some embodiments, wired connections such as Ethernet may be used in addition to or as an alternative to wireless connections for the network 104. In some cases, additional hardware elements such as routers or switches may be present in the network 104. In the illustrative embodiment, no IoT device 102 is connected to a network other than the network 104 connecting the IoT devices 102. Additionally or alternatively, some or all of the IoT devices 102 may be connected to an additional network, such as the Internet.

Figure 1B:
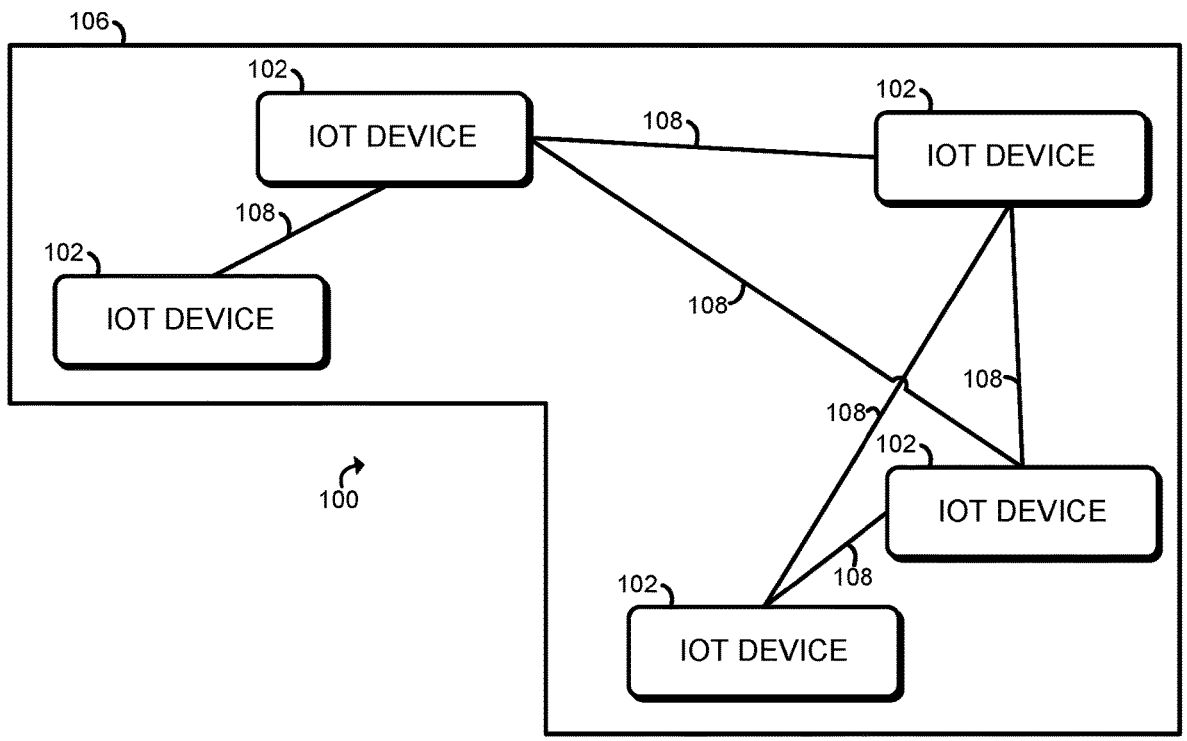

Referring now to FIG. 1B, an embodiment of the illustrative distributed Internet of Things (IoT) system 100 is shown with the network 104 embodied as several direct connections 108 between IoT devices 102. In the embodiment shown in FIG. 1B, there is no central server. In this embodiment, each IoT device 102 may be considered as a node on a graph, and each connection 108 between two IoT devices 102 may be considered as an edge on the graph. For any two IoT devices 102 in the distributed IoT system 100, as long as there is some path to transverse the graph from one IoT device 102 to the other, communication between the two IoT devices 102 is possible. Each connection 108 between two IoT devices 102 may be any type of wired or wireless communication connection (e.g., Ethernet, Bluetooth®, Wi-Fi®, WiMAX, near field communication (NFC), etc.).

Figure 2:
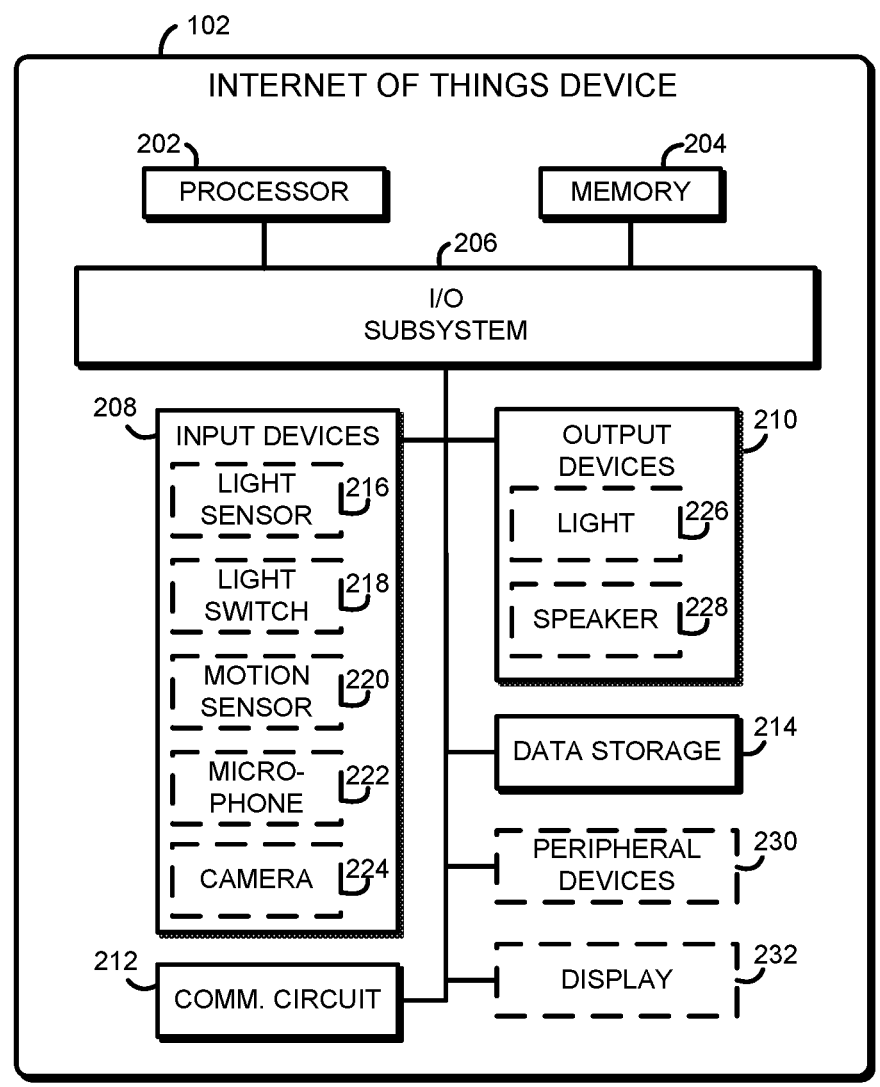
FIG. 2 is a simplified block diagram of at least one embodiment of an IoT device of the distributed IoT system of FIG. 1.

Referring now to FIG. 2, the illustrative IoT device 102 may be embodied as any type of compute device capable of performing the functions described herein. For example, the IoT device 102 may be embodied as or otherwise be included in, without limitation, a sensor device, an embedded computing system, a System-on-a-Chip (SoC), a control device (e.g., a light or temperature controller), a desktop computer, a server computer, a tablet computer, a notebook computer, a laptop computer, a smartphone, a cellular phone, a wearable computer, a handset, a messaging device, a camera device, a multiprocessor system, a processor-based system, a consumer electronic device, and/or any other computing device. The illustrative IoT device 102 includes a processor 202, a memory 204, an input/output (I/O) subsystem 206, one or more input devices 208 and/or one or more output devices 210, a communication circuit 212, and data storage 214. In some embodiments, one or more of the illustrative components of the IoT device 102 may be incorporated in, or otherwise form a portion of, another component. For example, the memory 204, or portions thereof, may be incorporated in the processor 202 in some embodiments.

The processor 202 may be embodied as any type of processor capable of performing the functions described herein. For example, the processor 202 may be embodied as a single or multi-core processor(s), a single or multi-socket processor, a digital signal processor, a graphics processor, a microcontroller, or other processor or processing/controlling circuit. Similarly, the memory 204 may be embodied as any type of volatile or non-volatile memory or data storage capable of performing the functions described herein. In operation, the memory 204 may store various data and software used during operation of the IoT device 102 such as operating systems, applications, programs, libraries, and drivers. The memory 204 is communicatively coupled to the processor 202 via the I/O subsystem 206, which may be embodied as circuitry and/or components to facilitate input/output operations with the processor 202, the memory 204, and other components of the IoT device 102. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 206 may form a portion of a system-on-a-chip (SoC) and be incorporated, along with the processor 202, the memory 204, and other components of the IoT device 102 on a single integrated circuit chip.

The input device 208 may be any device capable of generating an input signal (e.g., in response to a stimulus)

that may be useful to the distributed IoT system 100, such as a light sensor 216, a light switch 218, a motion sensor 220, a microphone 222, a camera 224, etc. The output devices 210 may include any device capable of generating an output that may be useful to the distributed IoT system 100, such as a light 226 or a speaker 228. Of course, the input devices 208 and the output devices 210 shown in FIG. 2 are not meant to be limiting, but merely provide a small sample of possible input and output devices. For example, additional devices such as a motor or actuator may be included in some embodiments. The broad nature of "things" that may be included as an IoT device 102 precludes a thorough listing of all devices, and as such the devices explicitly shown in FIG. 2 should not be considered limiting. In the illustrative embodiment, each IoT device 102 of the distributed IoT system 100 includes one input device 208 or one output device 210. Of course, in some embodiments, some of all of the IoT devices 102 may include any combination of input devices 208 and output devices 210, or even no input devices 208 and no output devices 210.

The communication circuit 212 may be embodied as any type of communication circuit, device, or collection thereof, capable of enabling communications between the IoT device 102 and other devices. To do so, the communication circuit 212 may be configured to use any one or more communication technology and associated protocols (e.g., Ethernet, Bluetooth®, Wi-Fi®, WiMAX, near field communication (NFC), etc.) to effect such communication.

The data storage 214 may be embodied as any type of device or devices configured for the short-term or long-term storage of data. For example, the data storage 214 may include any one or more memory devices and circuits, memory cards, hard disk drives, solid-state drives, or other data storage devices.

Of course, in some embodiments, the IoT device 102 may include other or additional components, such as those commonly found in a compute device. For example, the IoT device 102 may also have peripheral devices 230 and/or a display 232. The peripheral devices 230 may include a keyboard, a mouse, etc. In some cases, a peripheral device or a display may be included as an input device 208, an output device 210, or both (e.g., a touchscreen display).

The optional display 232 may be embodied as any type of display on which information may be displayed to a user of the IoT device 102, such as a liquid crystal display (LCD), a light emitting diode (LED) display, a cathode ray tube (CRT) display, a plasma display, an image projector (e.g., 2D or 3D), a laser projector, a touchscreen display, a heads-up display, and/or other display technology.

Figure 3:
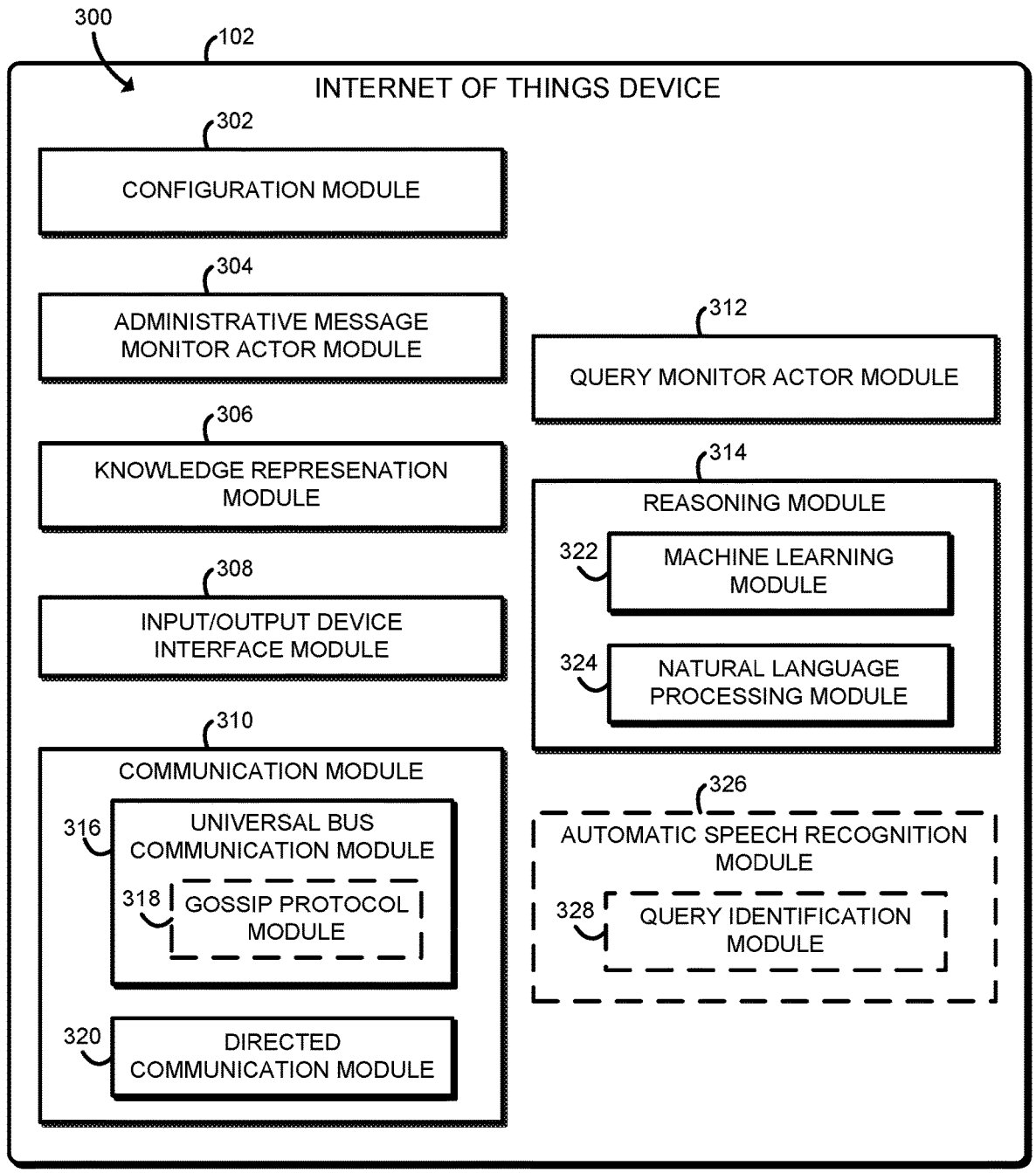
FIG. 3 is a block diagram of at least one embodiment of an environment that may be established by the IoT device of FIG. 2.

Referring now to FIG. 3, in use, each IoT device 102 may establish an environment 300. The illustrative environment 300 includes a configuration module 302, and administrative message monitor module 304, the knowledge representation module 306, the input/output device interface module 308, the communication module 310, the query monitor module 312, and the reasoning module 314. The various modules of the environment 300 may be embodied as hardware, software, firmware, or a combination thereof. For example, the various modules, logic, and other components of the environment 300 may form a portion of, or otherwise be established by, the processor 202 or other hardware components of the IoT device 102. As such, in some embodiments, one or more of the modules of the environment 300 may be embodied as circuitry or collection of electrical devices (e.g., a configuration circuit 302, an administrative message monitor circuit 304, a knowledge representation circuit 306, etc.). It should be appreciated that, in such embodiments, one or more of the circuits (e.g., the configuration circuit 302, the administrative message monitor circuit 304, the knowledge representation circuit 306, etc.) may form a portion of one or more of the processor 202, the memory 204, the I/O subsystem 206, and/or the data storage 214. Additionally, in some embodiments, one or more of the illustrative modules may form a portion of another module and/or one or more of the illustrative modules may be independent of one another.

Some of the modules of the IoT device 102 may be configured in some embodiments to act as independent actors of the IoT device 102 with a specific role. For example, the administrative message monitor module 304, the query monitor module 312, and the reasoning module 314, may each be configured to act as independent actors performing the corresponding function described for each of those modules. In the illustrative embodiment, each actor may, in response to a message it receives, make local decisions, create more actors, send more messages, and/or determine how to respond to the next message received. In some embodiments, the actors may have more or fewer capabilities. Of course, this configuration is merely one possible design choice, and the functionality described for each module may be implemented without the modules acting as independent actors.

The configuration module 302 is configured to determine and apply automatic or manual configuration settings. In the illustrative embodiment, if manual configuration settings are available when the IoT device 102 is initialized (i.e., turned on), the manual configuration settings are then applied. If manual configuration settings are not available when the IoT device 102 is initialized, the configuration module 302 may apply automatic configuration settings, such as by determining available input devices 208 and output devices 210, applying default settings, etc. The configuration settings may be manually updated at any time after initialization in the illustrative embodiment. In some embodiments, the configuration module 302 may apply or update the manual configuration settings prior to initialization, such as at the time of manufacture of the IoT device 102. The configuration settings may include settings such as the capabilities of input devices 208 and/or output devices 210 of the IoT device 102, an indication of the environment of the IoT device 102, and privacy settings of the IoT device 102. The manual configuration settings may be supplied by any means, such as by a wired connection, a wireless connection, removable media such as a USB memory stick, a peripheral device 230, etc.

The administrative message monitor module 304 is configured to monitor communication from other IoT devices 102 that are communicated to the IoT device 102 through the universal bus, through directed communication, or through other communication means. The administrative message monitor module 304 is configured to determine if a message received by the IoT device 102 is an administrative message and to update the knowledge representation module 306 accordingly. An administrative message may be embodied as any message describing the capability, functionality, or configuration of one or more of the IoT devices 102 of the distributed IoT system 100, as opposed to a message indicating an input from a user or a query for information. For example, an administrative message may indicate that a new IoT device 102 has joined the network 104 of the distributed IoT system 100, and may indicate the capability of that new IoT device 102. As another example, an administrative message may indicate that an IoT device 102 of the distributed IoT system 100 is not functioning properly.

The knowledge representation module 306 is configured to represent or otherwise store knowledge or information available to and relevant for the function of the IoT device 102. The knowledge representation module 306 may include a semantic network and/or an ontology, and be able to represent relationships between pieces of information stored in the knowledge representation module 306. In the illustrative embodiment, the knowledge representation module 306 is not directly accessible by any other IoT device 102. In some embodiments, such as embodiments with independent actors, there may be several knowledge representation modules 306, such as a separate knowledge representation module 306 for each actor.

The input/output device interface module 308 is configured to interface with the input devices 208 and output devices 210 present on the IoT device 102. The input/output device interface module 308 may employ any means to interface with the input devices 208 and output devices 210 such as electrical wires, a mechanical interface, a wireless interface, etc. The input/output device interface module 308 is configured to send appropriate messages to the universal bus or to other IoT devices 102 upon receipt of an input.

The communication module 310 is configured to send and receive communication messages to and from other IoT devices 102. The communication between IoT devices 102 may be accomplished through any appropriate communication protocol. In the illustrative embodiment, there is no central server, and each IoT device 102 in the distributed IoT system 100 is able to communicate directly with at least one other IoT device 102. As described above in regard to FIG. 1B, in such an embodiment, each IoT device 102 may be considered as a node on a graph, and each connection 108 between two IoT devices 102 may be considered as an edge on a graph. For any two IoT devices 102 in the distributed IoT system 100, as long as there is some way of traversing the graph from one IoT device 102 to the other, communication between the two is possible.

The communication module 310 includes a universal bus communication module 316. The universal bus communication module 316 allows the IoT device 102 to subscribe to the universal bus, receive messages on the universal bus, send messages on the universal bus, and relay messages on the universal bus. In the illustrative embodiment, the universal bus is embodied as a bus implemented by the collective behavior of all of the IoT devices 102 that are subscribed to the universal bus that ensures each message sent to the universal bus is received by every IoT device 102 subscribed to the universal bus. Any suitable protocol may be used to implement the universal bus, such as a graph traversal, a flooding algorithm, or other peer-to-peer algorithm. In some embodiments, a gossip protocol module 318 may implement a gossip protocol. In the illustrative embodiment, each IoT device 102 is aware of each other IoT device 102 subscribed to the universal bus. In some embodiments, each IoT device 102 may only be aware of a portion of the other IoT devices 102 subscribed to the universal bus, such as each directly-connected IoT device 102. In order to subscribe to the universal bus, an IoT device 102 sends a message indicating the request to one or more directly-connected IoT devices 102 that are subscribed to the universal bus. The subscription message may either be sent only to the directly-connected IoT devices 102 or may be sent out onto the universal bus itself. If an IoT device 102 wishes to unsubscribe from the universal bus, it may do so by sending an unsubscribe message in a similar manner.

The communication module 310 also includes a directed communication module 320. The directed communication module 320 is configured to send, relay, or receive a message that is directed to one or more specified IoT devices 102. When the specified IoT device 102 is not directly-connected to the source IoT device 102 that is the original source of the message, the source IoT device 102 may send the message to one or more directly-connected IoT devices 102, which will then relay the message to the specified IoT device 102 using any suitable protocol. Of course, the directed communication module 320 may send a message directly to a specified IoT device 102 if there is a direct connection between the two IoT devices 102.

The query monitor module 312 is configured to monitor and analyze messages received from the universal bus as well as messages directed to the IoT device 102. Each message is analyzed to determine whether the message contains a query. A query may be a request for information, an instruction from a user, an input from an input device 208, an instruction from another IoT device 102, information being disseminated by another IoT device 102, or any other query relating to the input or output of the distributed IoT system 100.

The reasoning module 314 is configured to apply a reasoning algorithm to determine a course of action for the IoT device 102 to take in response to an input from a user or of a message from another IoT device 102. The reasoning module 314 may employ any type of reasoning algorithm, such as a constraint solver, a logic program, a rules engine, etc. The reasoning module 314 includes a machine learning module 322 and a natural language processing module 322.

The machine learning module 322 is configured to apply one or more machine learning algorithms to recognize and respond to patterns in the inputs received by the distributed IoT system 100. For example, if each time a user of the distributed IoT system 100 comes home, the user may turn on a specific sequence of lights. The machine learning module 322 may recognize the pattern, and, if the IoT device 102 controls one of those lights, automatically turn on the light when the user comes home. The machine learning module 322 may employ any one or more suitable machine learning algorithms, such as a neural network (including a deep neural network), a support vector machine, cluster analysis, etc.

The natural language processing module 324 is configured to parse commands spoken by the user that may be received by the input/output device interface module 308 or the communication module 310. For example, the user might say, "Light all lights," and after receiving that message the natural language processing module 324 may send a message to the universal bus that all lights should be turned on. In some embodiments, the natural language processing module 324 may be a machine-learning-based algorithm, and be fully trained to recognize natural language. Additionally or alternatively, the natural language processing module 324 may employ machine learning techniques to train itself based on input from the user. Of course, in some embodiments, natural language processing may not be required in order to respond to some or all commands of the user of the IoT system 100.

In some embodiments, such as embodiments with a microphone 222, the IoT device 102 may include an automatic speech recognition module 326. The automatic speech recognition module 326 is configured to transcribe speech data of the user that is captured by the microphone 222. In some embodiments, the microphone 222 may always be capturing sound data, and the automatic speech recognition module 326 may always be processing data captured by the microphone 222 looking for speech data. In other embodiments, the microphone 222 may only be capturing sound data when, e.g., a user presses a button. The automatic speech recognition module 326 includes a query identification module 328, which is configured to process transcribed speech data and determine if it includes a query. Of course, if the microphone 222 is always capturing sound, the microphone 222 will often capture speech data not related to any query of the distributed IoT system 100, such as a conversation the user is having. When the query identification module 328 identifies a query, it responds appropriately, such as by performing an action, sending the query to the universal bus, or sending a directed communication containing the query to a specified IoT device 102.

Figure 4:
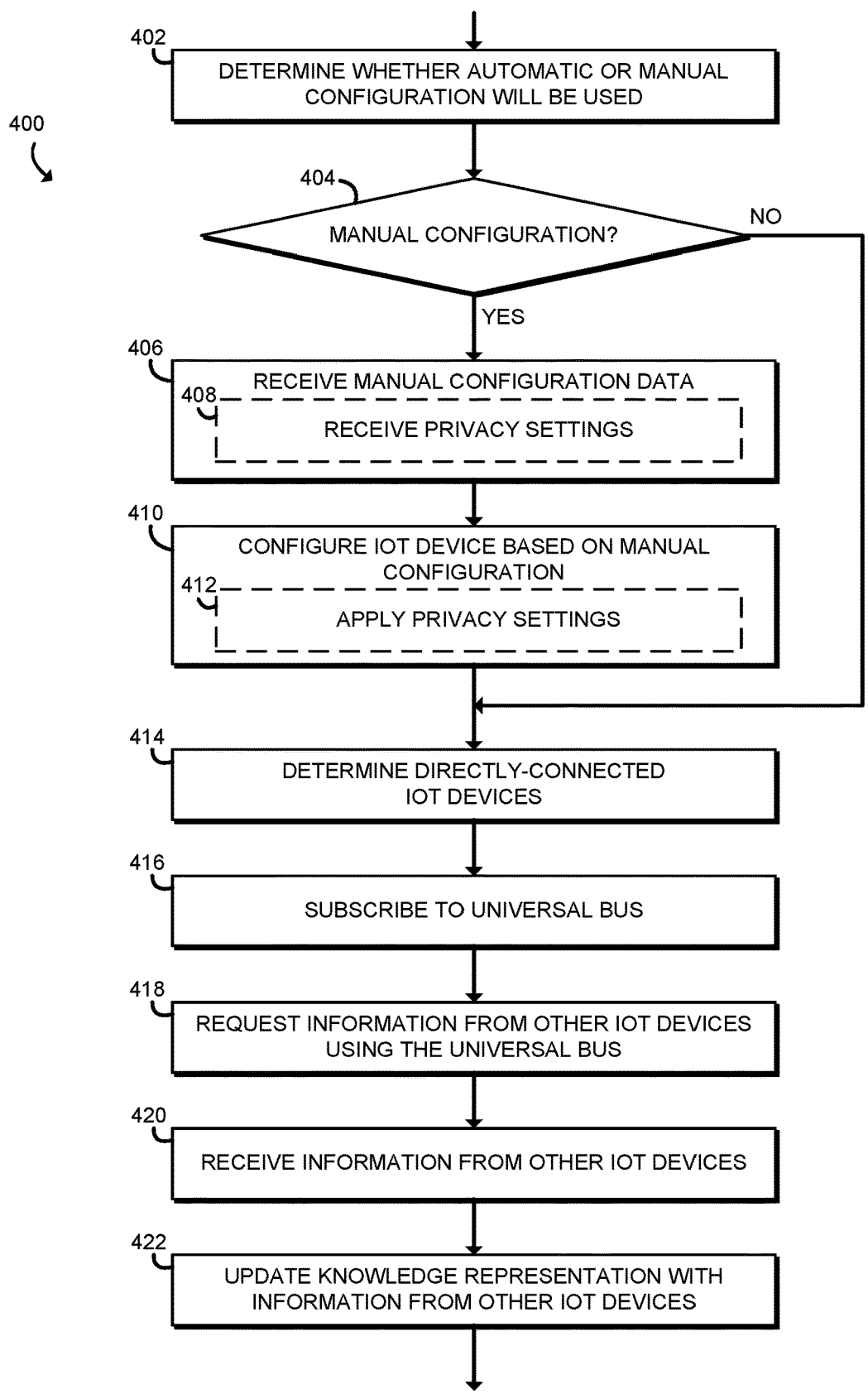
FIG. 4 is a simplified flow diagram of at least one embodiment of a method for initializing the IoT device of FIG. 2.

Referring now to FIG. 4, in use, the IoT device 102 may execute a method 400 for configuring the IoT device 102. It should be appreciated that, in some embodiments, the techniques of the method 400 may be executed by one or more of the modules of the IoT device 102 as shown in FIG. 3. The method 400 begins in block 402, in which the IoT device 102 determines whether automatic or manual configuration of the IoT device 102 will be used. In the illustrative embodiment, the IoT device 102 may determine that manual configuration will be used by determining that manual configuration data is being received or is otherwise available. In such an embodiment, operating the IoT device 102 may be the first indication that automatic configuration will be used. Of course, even if automatic configuration is initially used, manual configuration may still be done after operation of the IoT device 102 commences. In other embodiments, the IoT device 102 may be configured to wait for manual configuration before becoming operational. In block 404, the IoT device 102 proceeds to block 406 if manual configuration will be used and proceeds to block 414 if automatic configuration will be used.

In block 406, the IoT device 102 receives manual configuration data. The IoT device 102 may receive the manual configuration data through any communication means, such as a wired or wireless communication, jumper pins, or switches on the IoT device 102 such as dual in-line package (DIP) switches. In some embodiments, the manual configuration data may be stored in the IoT device 102 at the time of manufacture. In other embodiments, the manual configuration data may be received by the IoT device 102 from an end user of the distributed IoT system 100. The manual configuration data may indicate any type of configuration data for operating the IoT device 102, such as the input device(s) 208 and/or output device(s) 210 that are connected, the environment of the IoT device 102 (such as home, office, industrial, etc.), the communication protocol to be used, training data or configuration data for any machine-learning-based algorithms, information to store in the knowledge representation, programmed responses to certain inputs (either from an input from an input device 208 connected to the IoT device 102 or an input received from another IoT device 102), etc. In some embodiments, the IoT device 102 may receive the manual configuration data by determining what input device(s) 208 and/or output device(s) 210 are connected.

Optionally, the IoT device 102 receives privacy settings in block 408. The privacy settings may indicate what sort of data should and should not be shared and under what circumstances. For example, the privacy settings may indicate that the IoT device 102 may indicate whether a person is currently present in a room, but only to certain other IoT devices 102 of the distributed IoT system 100.

In block 410, the IoT device 102 applies the manual configuration settings that were received in block 406. In embodiments wherein privacy settings were received in block 408, the privacy settings are applied in block 412.

In block 414, the IoT device 102 determines which other IoT devices 102 of the distributed IoT system 100 are directly connected to the IoT device 102. For example, the IoT device 102 may determine which other IoT devices 102 are directly connected through a wireless connection (i.e., within range of the wireless signal) by sending a special announcement message that informs any IoT devices 102 in range that a new IoT device 102 is available. Each IoT device 102 in range may then reply to the IoT device 102 that sent the announcement message. In some embodiments, the IoT device(s) 102 that received the announcement message transmits the announcement message to other IoT devices 102 of the distributed IoT system 100 by sending the message on the universal bus. Each IoT device 102 may, in some embodiments, periodically update which other IoT devices 102 are directly connected, such as once per day.

In block 416, the IoT device 102 subscribes to the universal bus. The IoT device 102 may subscribe to the universal bus by sending a subscription message to one or more directly-connected IoT devices 102. In some embodiments, the one or more directly-connected IoT devices 102 may transmit the subscription message to the universal bus.

In block 418, the IoT device 102 requests information from the other IoT devices 102 that are subscribed to the universal bus. For example, the IoT device 102 may request information indicating each input device 208 and output device 210 connected to each other IoT device 102. The IoT device 102 may also request information indicative of patterns that other IoT devices 102 have recognized or conclusions that other IoT devices 102 have reached, such as that certain lights should be turned on under certain conditions.

In block 420, the IoT device 102 receives the requested information from the other IoT devices 102. In block 422 the IoT device 102 updates the knowledge representation with the information that was received from the other IoT devices 102.

Figure 5:
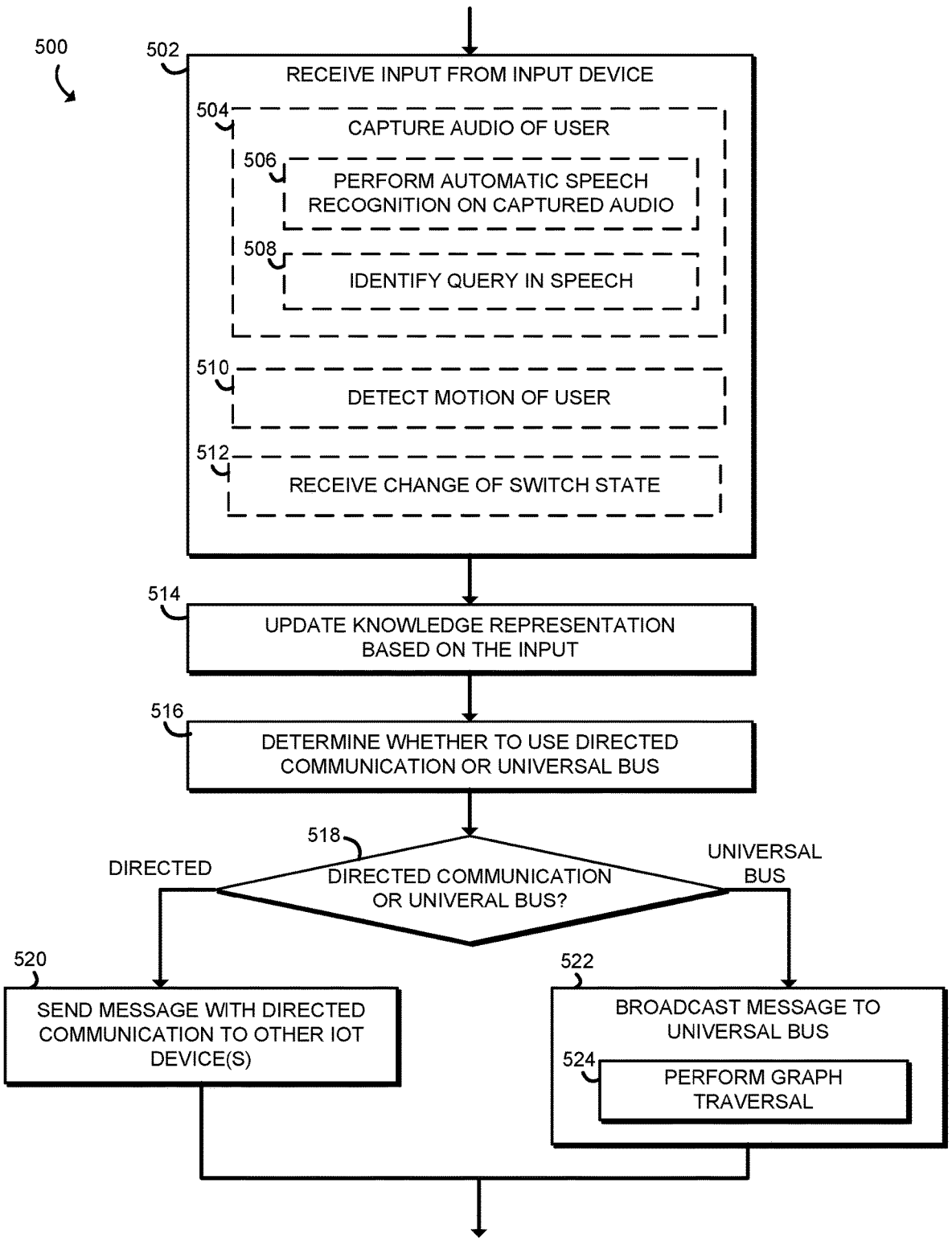
FIG. 5 is a simplified flow diagram of at least one embodiment of a method for handling an input by the IoT device of FIG. 2.

Referring now to FIG. 5, in use, the IoT device 102 may execute a method 500 for handling an input from an input device 208. It should be appreciated that, in some embodiments, the techniques of the method 500 may be executed by one or more of the modules of the IoT device 102 as shown in FIG. 3. The method 500 beings in block 502, in which the IoT device 102 receives an input from an input device 208. In embodiments with a microphone 222, the IoT device 102 may capture audio from a user in block 504. In block 506, the IoT device 102 may perform automatic speech recognition on the captured audio, and in block 508 the IoT device 102 may identify any query that may be present in the transcribed speech of the captured audio.

In embodiments with a light sensor 216 or a motion sensor 220, the IoT device 102 may receive an input indicative of movement in block 510, such as a user walking along a hallway. In embodiments with a light switch 218, the IoT device 102 may receive an indication of a change of state of the light switch 218 (e.g., that the switch was flipped). Of course, in some embodiments, additional input devices 208 other than those shown in FIG. 2 may be present, and may provide input in a similar manner as the input devices 208 explicitly described above.

In block 514, the IoT device 102 updates the knowledge representation based on the input, such as by storing the input. In block 516, the IoT device 102 determines whether to send a message based on the input to one or more specified IoT devices 102 with use of directed communication or to send the message on the universal bus. For a generic input, the IoT device 102 will send the message on the universal bus. However, in some cases, the IoT device 102 may recognize a pattern that the input fits (such as by using the machine learning module 322), and then determine that the message need only be sent to one or more specified IoT devices 102. For example, the IoT device 102 may receive as an input that a user is walking down the hallway. If the IoT device 102 has determined, by using the machine learning module 322, that every time the user walks down the hallway she turns on a certain light, the IoT device 102 may send a message only to the IoT device 102 associated with that light. Of course, in some cases, the IoT device 102 may determine that the input received in block 502 is not significant or otherwise not of interest to other IoT devices 102, and not send any message at all.

In block 518, if the IoT device 102 is to use directed communication, the method 500 proceeds to block 520. Otherwise, if the IoT device 102 is to use the universal bus, the method 500 proceeds to block 522.

In block 520, the IoT device 102 sends a message with directed communication to one or more specified other IoT devices 102. In block 522, the IoT device 102 broadcasts the message to the universal bus. In the illustrative embodiment, the distributed IoT system 100 relays the message along the universal bus by performing a graph traversal in block 524. In either case, the message contains or otherwise indicates the input that the IoT device 102 received in block 502.

Figure 6:
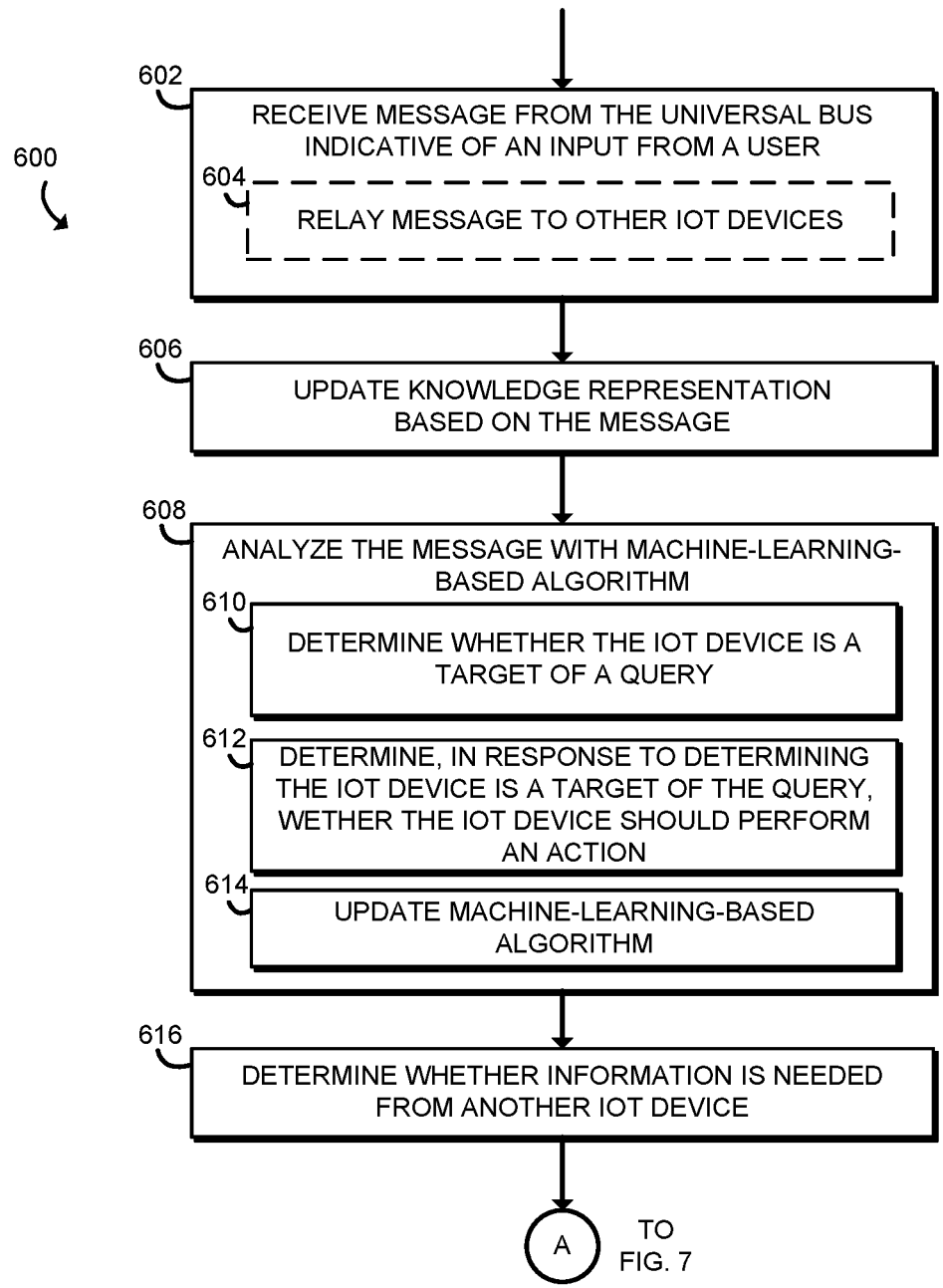
FIGS. 6 & 7 are a simplified flow diagram of at least one embodiment of a method for processing a message from a universal bus by the IoT device of FIG. 2.

Referring now to FIG. 6, in use, the IoT device 102 may perform a method 600 for processing a message indicative of an input from the universal bus. It should be appreciated that, in some embodiments, the techniques of the method 600 may be executed by one or more of the modules of the IoT device 102 as shown in FIG. 3. The method 600 begins in block 602, in which the IoT device 102 receives a message from the universal bus. In some cases, depending on certain factors such as the position of the IoT device 102 in the graph of connected IoT devices 102 and the protocol used for the universal bus, the IoT device 102 may relay the message to one or more other IoT devices 102 in block 604. In block 606, the IoT device 102 updates the knowledge representation based on the message, such as by storing the message.

In block 608, the IoT device 102 analyzes the message with reasoning algorithms and/or machine-learning-based algorithms. For example, the IoT device 102 may employ a machine-learning-based algorithm to determine if a particular output is expected of the IoT device 102 based on the message received indicative of the input as well as past messages received indicative of past input.

In block 610, the IoT device 102 determines whether the IoT device 102 is a target of a query based on the message. For example, if the input indicated by the message is a motion sensed by a motion sensor 220, and the IoT device 102 may determine that it is a target of a query, since in the past this sensed motion has indicated that a certain light controlled by the IoT device 102 should turn on. In block 612, the IoT device 102 determines, in response to determining that the IoT device 102 is a target of the query, whether the IoT device 102 should perform an action. In block 614, the IoT device 102 updates the machine-learning-based algorithm based on the received message.

In block 616, the IoT device 102 determines whether information is needed from another IoT device 102. For example, the query may be a motion sensed by a motion sensor 220, and the IoT device 102 may determine that it should turn on a light if it is dark outside (e.g., if it is night).

In this example, the IoT device 102 may determine that information is required as to whether or not it is dark outside. The method 600 then proceeds to block 618 in FIG. 7.

Figure 7:
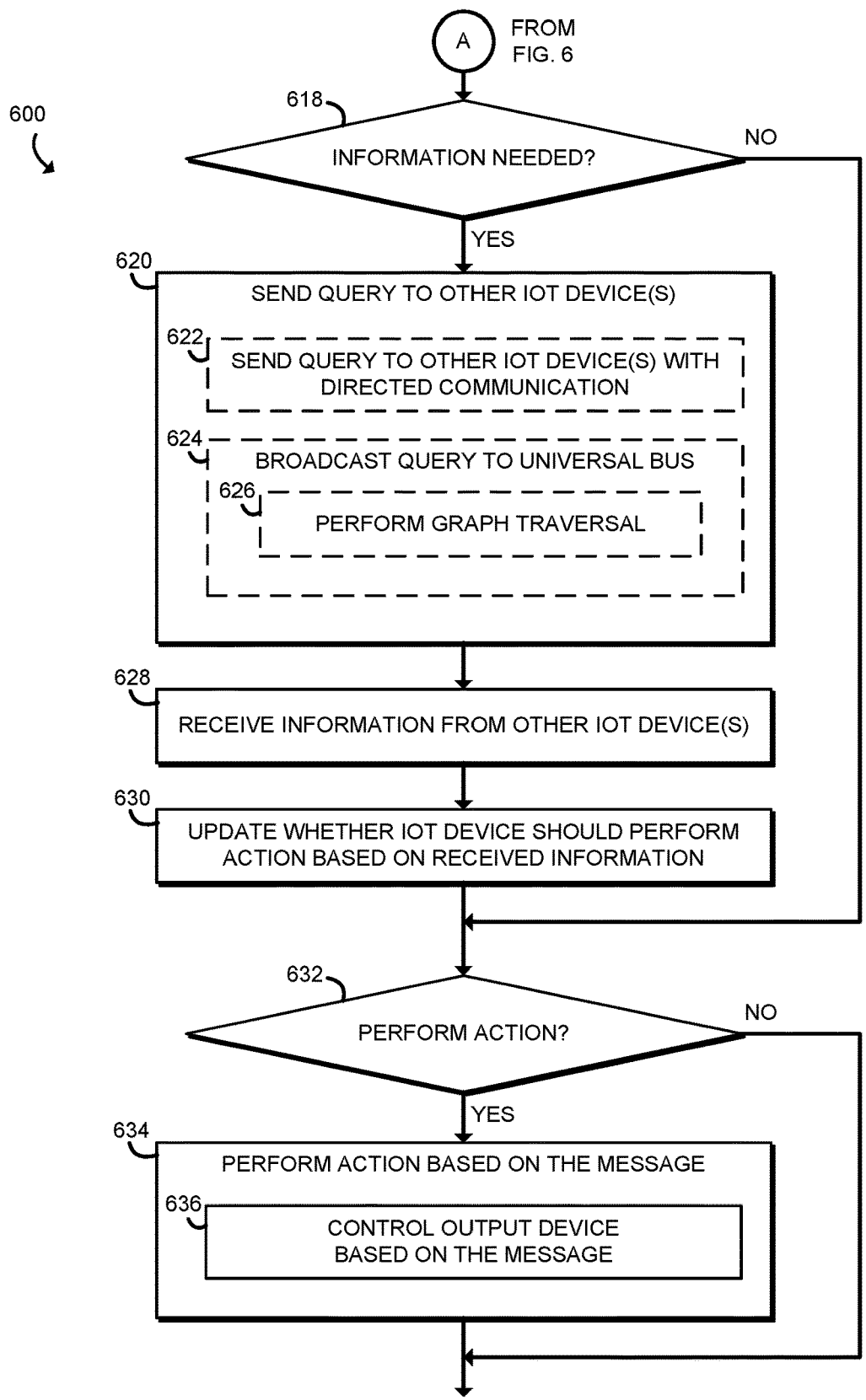

In block 618 in FIG. 7, if information is needed from another IoT device 102, the method 600 proceeds to block 620. Otherwise, if information is not needed from another IoT device 102, the method 600 proceeds to block 632.

In block 620, the IoT device 102 sends a query to one or more other IoT devices 102 with a request for information. In cases in which the IoT device 102 knows that the information is available at one or more specified IoT devices 102, the IoT device 102 may send directed communication to the one or more specified IoT devices 102 in block 622. In cases where the IoT device 102 does not know that the information is available at a specific IoT device 102, the IoT device 102 broadcasts the query to the universal bus in block 624. In some embodiments, in block 626, the IoT device 102 broadcasting the query to the universal bus initiates a graph traversal to send the message to some or all of the other IoT devices 102, such as all IoT devices 102 subscribed to the universal bus. In block 628, the IoT device 102 receives the requested information from other IoT devices 102. In some instances, depending on the nature of the information and the privacy settings of the IoT device 102 sending and/or requesting the information, the communication of the requested information may be encrypted. In block 628, the IoT device 102 updates the determination made in block 612 as to whether the IoT device 102 should perform an action based on the received information.

In block 632, if the IoT device 102 should perform an action, the method 600 proceeds to block 634. If the IoT device 102 should not perform an action, the method 600 proceeds to the end of the method 600 after block 634. In block 634, the IoT device 102 performs an action based on the message. For example, the IoT device 102 may control an output device 210 based on the message in block 636.

Figure 8:
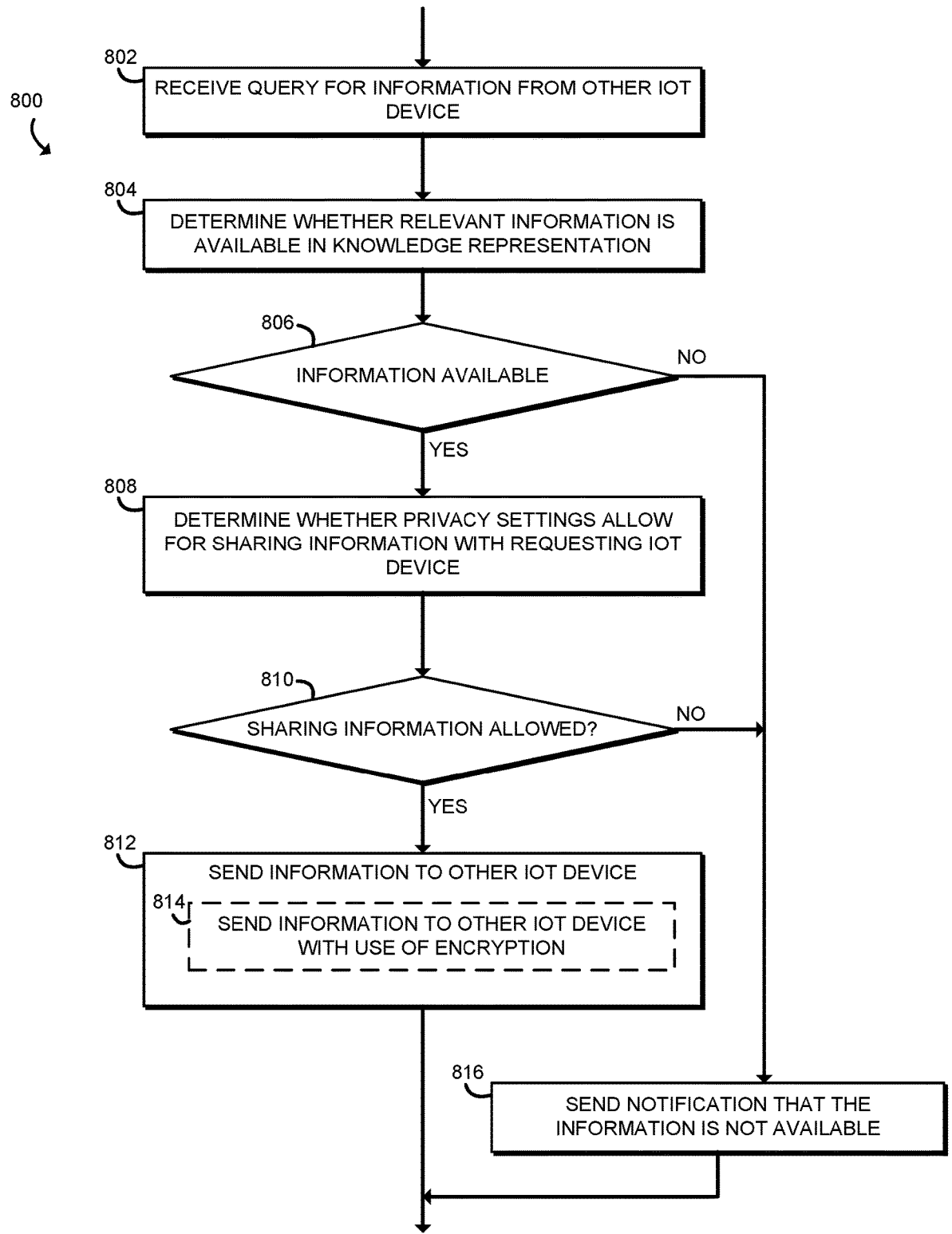
FIG. 8 is a simplified flow diagram of at least one embodiment of a method for responding to a query for information by the IoT device of FIG. 2.

Referring now to FIG. 8, the IoT device 102 may execute a method 800 for responding to a query for information from another IoT device 102. It should be appreciated that, in some embodiments, the techniques of the method 800 may be executed by one or more of the modules of the IoT device 102 as shown in FIG. 3. The method 800 begins in block 802, wherein the IoT device 102 receives a query for information from another IoT device 102.

In block 804, the IoT device 102 determines whether the relevant information is available in the knowledge representation. In block 806, if the information is available, the method 800 proceeds to block 808. Otherwise, if the information is not available, the method 800 proceeds to block 816.

In block 808, the IoT device 102 determines whether the privacy settings allow for sharing the information with the requesting IoT device 102. In block 810, if sharing the information is allowed, the method 800 proceeds to block 812. Otherwise, if sharing is not allowed, the method 800 proceeds to block 816.

In block 812, the IoT device 102 sends the requested information to the other IoT device 102. Depending on certain factors such as the nature of the information and the privacy settings, the IoT device 102 may send the requested information to the other IoT device 102 with use of encryption.

Referring back to blocks 806 and 810, if the information is not available in the knowledge representation or the information is not allowed to be shared, the IoT device 102 jumps to block 816, in which the IoT device 102 sends a notification to the requesting IoT device 102 that the information is not available. In some embodiments, the IoT device 102 may specify whether the information is not in the knowledge representation or the information is not allowed to be shared. In other embodiments, the IoT device 102 may simply notify the requesting IoT device 102 that it is unable to fulfill the request for information without detailing why. In still other embodiments, the IoT device 102 may not send any notification at all.

Figure 9:
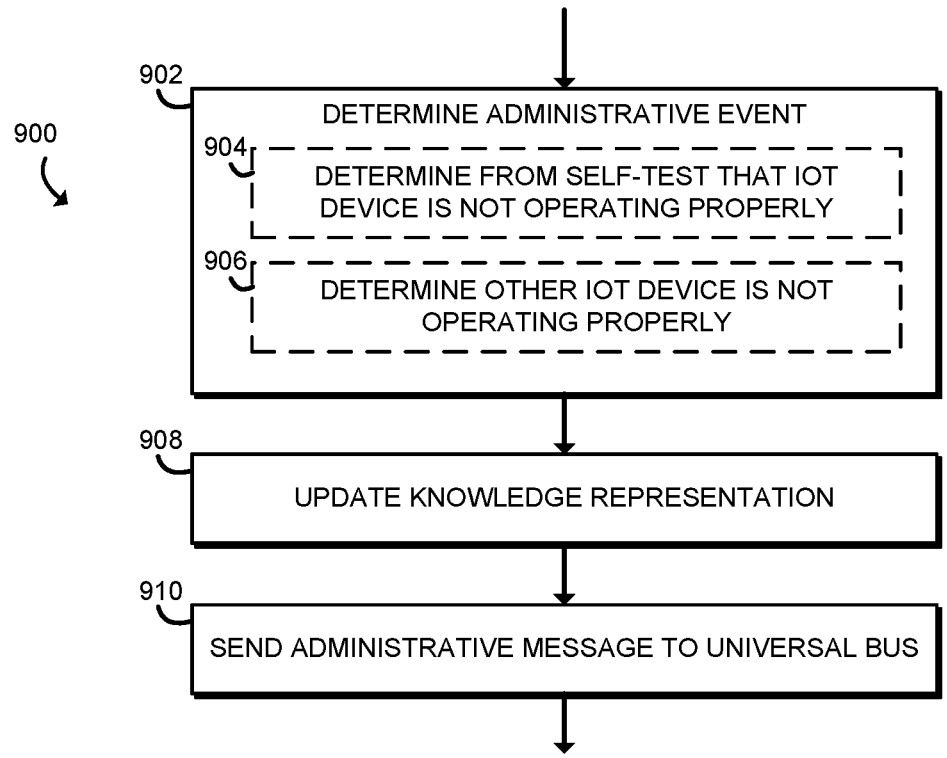
FIG. 9 is a simplified flow diagram of at least one embodiment of a method for processing an administrative event by the IoT device of FIG. 2.

Referring now to FIG. 9, the IoT device 102 may execute a method 900 for processing an administrative event. It should be appreciated that, in some embodiments, the techniques of the method 900 may be executed by one or more of the modules of the IoT device 102 as shown in FIG. 3. An administrative event is any event that affects the status of the distributed IoT system 100, such as available IoT devices 102 and their capabilities or the status of any connection 108 of the distributed IoT system 100. The method 900 begins in block 902, in which the IoT device 102 determines an administrative event. The IoT device 102 may determine an administrative event relating to itself in block 904, in which the IoT device 102 determines from a self-test that it is not operating properly, such as a non-functioning input device 208 or output device 210. The IoT device 102 may also determine an administrative event that another IoT device 102 is not operating properly in block 906, such as by determining that the IoT device 102 is not responsive or that the IoT device 102 is responding with garbled or otherwise improper messages. Of course, in some embodiments, the IoT device 102 may determine additional or alternative administrative events, such as events relating to a connection 108 with another IoT device 102.

In block 908, the IoT device 102 updates the knowledge representation based on the administrative event. In block 910, the IoT device 102 sends a message indicative of the administrative event to the universal bus.

Figure 10:
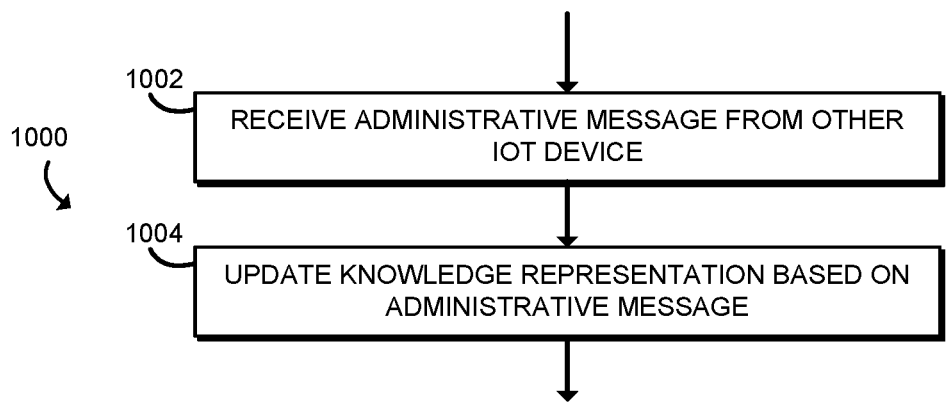
FIG. 10 is a simplified flow diagram of at least one embodiment of a method for processing an administrative message by the IoT device of FIG. 2.

Referring now to FIG. 10, the IoT device 102 may execute a method 1000 for processing an administrative message. It should be appreciated that, in some embodiments, the techniques of the method 1000 may be executed by one or more of the modules of the IoT device 102 as shown in FIG. 3. The method 1000 begins in block 1002, in which the IoT device 102 receives an administrative message from another IoT device 102. In block 1004, the IoT device 102 updates the knowledge representation based on the administrative message.

In order to further clarify the scope of the concepts disclosed herein, several example use cases are provided. In one use case, a first IoT device 102 with a microphone 222 captures a user saying, "Turn on all lights." The first IoT device 102 performs automatic speech recognition to transcribe the user's speech and then sends the message out on the universal bus. Each other IoT device 102 of the distributed IoT system 100 receives the message, and each IoT device 102 that has a light 226 determines it is the target of a query to turn on its light 226 and then turns on its light 226.

In another use case, a first IoT device 102 with a microphone 222 captures a user saying, "Turn on the lights in the dining room." The first IoT device 102 performs automatic speech recognition to transcribe the user's speech and then sends the message out on the universal bus. Each other IoT device 102 of the distributed IoT system 100 receives the message, and each IoT device 102 that has a light 226 and is in the dining room determines it is the target of a query to turn on its light 226 and then turns on its light 226. In this use case, an IoT device 102 that does not know where it is may decide not to turn on its light 226. If the user then turns on the light 226 of that IoT device 102 manually, the IoT device 102 may determine that it is in the dining room, and update its knowledge representation accordingly.

In another use case, a first IoT device 102 with a microphone 222 captures a user saying, "Turn on the lights where the kids are." The first IoT device 102 performs automatic speech recognition to transcribe the user's speech and then sends the message out on the universal bus. Each other IoT device 102 of the distributed IoT system 100 receives the message, and a target IoT device 102 with a light 226 determines it is a target of a query, but may need more information. The target IoT device 102 sends a message to the universal bus asking if kids are present in the room of the target IoT device 102. An additional IoT device 102 with a motion sensor 220 or a camera 224 may detect that a kid is present in that room. The additional IoT device 102 will check its privacy settings, and if the privacy settings permit, send a message to the target IoT device 102 that a kid is present in the room. The target IoT device 102 may then turn on its light 226 based on the query from the user and the information received from the additional IoT device 102.

In yet another use case, a first IoT device 102 with a microphone 222 captures a user saying, "Turn on the lights where any person is." The first IoT device 102 performs automatic speech recognition to transcribe the user's speech and then sends the message out on the universal bus. Each other IoT device 102 of the distributed IoT system 100 receives the message, and a target IoT device 102 with a light 226 determines it is a target of a query, but may need more information. The target IoT device 102 sends a message to the universal bus asking if anyone is present in the room of the target IoT device 102. An additional IoT device 102 with a motion sensor 220 or a camera 224 may detect that a person is present in that room. The additional IoT device 102 will check its privacy settings, and if the privacy settings permit, send a message to the target IoT device 102 that a person is present in the room. The target IoT device 102 may then turn on its light 226 based on the message from the first IoT device 102 and the information received from the additional IoT device 102.

In a further use case, a first IoT device 102 with a microphone 222 captures a user saying, "Turn on the lights where Bob was at 5 PM." The first IoT device 102 performs automatic speech recognition to transcribe the user's speech and then sends the message out on the universal bus. Each other IoT device 102 of the distributed IoT system 100 receives the message, and a target IoT device 102 with a light 226 determines it is a target of a query, but may need more information. The target IoT device 102 sends a message to the universal bus asking if Bob was present in the room of the target IoT device 102 at 5 PM. An additional IoT device 102 with a camera 224 may have stored in its knowledge representation who was present in that room at 5 PM based on facial recognition of images captured at that time. The additional IoT device 102 will check its privacy settings, and if the privacy settings permit, send a message to the target IoT device 102 that Bob was not in the room at 5 PM. The target IoT device 102 may then determine that it need not perform an action based on the message from the first IoT device 102 and the information received from the additional IoT device 102.

It should be appreciated that each of FIGS. 4-10 may be executed by some or all of the modules of the IoT device 102. In particular, in some embodiments, such as embodiments with independent actors, different parts of the flowcharts may be executed by different modules of the IoT device 102, and the control of the execution of the flowcharts may be controlled by messages passed between modules.

EXAMPLES

Illustrative examples of the devices, systems, and methods disclosed herein are provided below. An embodiment of the devices, systems, and methods may include any one or more, and any combination of, the examples described below.

Example 1 includes an Internet of Things (IoT) device comprising a communication module to receive, from a universal bus to which the IoT device is subscribed, a message transmitted by another IoT device to the universal bus, wherein the message is indicative of an input from a user; a query monitor module to determine whether the IoT device is a target of a query based on the message; a reasoning module to determine an action to be performed in response to a determination that the IoT device is the target of the query; and perform, in response to the determination that the IoT device is the target of the query, the action.

Example 2 includes the subject matter of Example 1, and wherein to determine the action to be performed comprises to determine, based on a machine-learning-based algorithm of the IoT device, the action to be performed.

Example 3 includes the subject matter of any of Examples 1 and 2, and wherein the reasoning module is further to update the machine-learning-based algorithm based on the input.

Example 4 includes the subject matter of any of Examples 1-3, and wherein the reasoning module is further to determine, with the machine-learning-based algorithm and in response to the determination that the IoT device is the target of the query, whether information is needed from one or more additional IoT devices for the IoT device to perform the action; wherein the communication module is further to (i) send, in response to a determination that the information is needed from the one or more additional IoT devices, an information query to the one or more additional IoT devices and (ii) receive, from the one or more additional IoT devices, the information; and wherein to determine, based on the machine-learning-based algorithm, the action to be performed comprises to determine, based on the machine-learning-based algorithm and the information, an action to be performed.

Example 5 includes the subject matter of any of Examples 1-4, and wherein to determine whether the information is needed from one or more additional IoT devices comprises to determine, based on the machine-learning-based algorithm, that the information is needed from a specified IoT device, and wherein to send the query to the one or more additional IoT devices comprises to send the query with use of directed communication to the specified IoT device.

Example 6 includes the subject matter of any of Examples 1-5, and wherein to send the query to the one or more additional IoT devices comprises to send the query to the universal bus.

Example 7 includes the subject matter of any of Examples 1-6, and wherein to send the query to the universal bus comprises to send the query to each of a plurality of IoT devices to which the IoT device is directly connected, wherein the query comprises an indication that the query is intended for the universal bus.

Example 8 includes the subject matter of any of Examples 1-7, and further including a knowledge representation module to update a knowledge representation of the IoT device based on the input, wherein the knowledge representation defines information usable by the IoT device to perform the action.

Example 9 includes the subject matter of any of Examples 1-8, and wherein to determine whether the IoT device is the target of the query comprises to access a knowledge representation of the IoT device, wherein the knowledge representation defines information usable by the IoT device to perform the action.

Example 10 includes the subject matter of any of Examples 1-9, and wherein to determine the action to be performed comprises to access a knowledge representation of the IoT device, wherein the knowledge representation defines information usable by the IoT device to perform the action.

Example 11 includes the subject matter of any of Examples 1-10, and wherein to perform the action comprises to control an output device of the IoT device.

Example 12 includes the subject matter of any of Examples 1-11, and wherein the output device comprises a light, a speaker, a motor, or an actuator.

Example 13 includes the subject matter of any of Examples 1-12, and wherein to receive, from the universal bus, the message indicative of the input from the user comprises to receive the message from a source IoT device directly connected to the IoT device; to determine whether the message should be sent to one or more additional IoT devices different from the source IoT device and directly connected to the IoT device; and to send, in response to a determination that the message should be sent to the one or more additional IoT devices, the message to the one or more additional IoT devices.

Example 14 includes the subject matter of any of Examples 1-13, and further including a knowledge representation module, wherein the knowledge representation module comprises a knowledge representation that defines information usable by an additional IoT device to perform an additional action, wherein the communication module is further to receive an information query for the information from the additional IoT device; wherein the knowledge representation module is to determine whether the information is in the knowledge representation and to determine, based on a privacy setting of the IoT device, whether sharing of the information is allowed; and wherein the communication module is further to send, based on a determination that the information is in the knowledge representation and a determination that sharing of the information is allowed, the information to the additional IoT device.

Example 15 includes the subject matter of any of Examples 1-14, and wherein to send the information to the additional IoT device comprises to encrypt the information and send the encrypted information to the additional IoT device.

Example 16 includes the subject matter of any of Examples 1-15, and wherein the communication module is further to determine one or more directly-connected IoT devices to which the IoT device is directly connected; and subscribe the IoT to the universal bus, wherein to subscribe the IoT to the universal bus comprises to send a subscription message to each of the one or more directly-connected IoT devices.

Example 17 includes the subject matter of any of Examples 1-16, and wherein the communication module is further to request information from each IoT device of a plurality of IoT devices subscribed to the universal bus; and receive information from each IoT device of the plurality of IoT devices subscribed to the universal bus.

Example 18 includes the subject matter of any of Examples 1-17, and further including a configuration module to receive manual configuration settings defined by the user; and configure the IoT device based on the manual configuration settings, wherein to configure the IoT device comprises to update a knowledge representation of the IoT device based on the manual configuration settings, wherein the knowledge representation defines information usable by the IoT device to perform the action.

Example 19 includes the subject matter of any of Examples 1-18, and further including an administrative message monitor module to determine an administrative event indicative of an operational characteristic of the IoT device or another IoT device; and a knowledge representation module to update a knowledge representation based on the administrative event, wherein the knowledge representation defines information usable by the IoT device to perform the action, wherein the communication module is further to send, to the universal bus, an administrative message indicative of the administrative event.

Example 20 includes the subject matter of any of Examples 1-19, and wherein to determine the administrative event comprises to determine that the IoT device is not operating properly.

Example 21 includes the subject matter of any of Examples 1-20, and wherein to determine the administrative event comprises to determine that an additional IoT device is not operating properly.

Example 22 includes the subject matter of any of Examples 1-21, and wherein the communication module is further to receive, from the universal bus, an administrative message indicative of an operational characteristic of the IoT device or another IoT device, further comprising a knowledge representation module to update a knowledge representation based on the administrative message.

Example 23 includes the subject matter of any of Examples 1-22, and wherein the communication module is further to receive, through directed communication from an additional IoT device, an administrative message indicative of an operational characteristic of the IoT device or another IoT device; and further comprising a knowledge representation module to update a knowledge representation based on the administrative message, wherein the knowledge representation defines information usable by the IoT device to perform the action.

Example 24 includes an Internet of Things (IoT) device comprising an input/output device interface module to receive, with use of an input device, a first input from a user of the IoT device and a second input from the user of the IoT device; a reasoning module to determine, with use of a machine-learning-based algorithm, whether to (i) communicate a first message indicative of the first input with use of directed communication to one or more other IoT devices or (ii) communicate the first message to a universal bus to which the IoT device is subscribed; determine, with use of the machine-learning-based algorithm, whether to (i) communicate a second message indicative of the second input with use of directed communication to one or more other IoT devices or (ii) communicate the second message to the universal bus; a communication module to send, in response to a determination to communicate the first message to the universal bus, the first message to the universal bus; send, in response to a determination to communicate the second message with use of directed communication to the one or more other IoT devices, the second message with use of directed communication to the one or more other IoT devices.

Example 25 includes the subject matter of Example 24, and wherein the input device comprises a microphone and wherein the first input comprises captured audio data, further comprising an automatic speech recognition module to perform automatic speech recognition on the captured audio data to generate transcribed speech data; and determine whether the transcribed speech data comprises a query, wherein to determine whether to communicate the first message indicative of the first input with use of directed communication to one or more other IoT devices or to communicate the first message to the universal bus to which the IoT device is subscribed comprises to determine, based on a determination that the transcribed speech data comprises the query, whether to communicate the first message indicative of the first input with use of directed communication to one or more other IoT devices or to communicate the first message to the universal bus to which the IoT device is subscribed.

Example 26 includes the subject matter of any of Examples 24 and 25, and wherein the input device comprises a motion sensor.

Example 27 includes the subject matter of any of Examples 24-26, and wherein the input device comprises a switch.

Example 28 includes the subject matter of any of Examples 24-27, and wherein the input device comprises a light sensor.

Example 29 includes the subject matter of any of Examples 24-28, and wherein the input device comprises a camera.

Example 30 includes a method for operating an Internet of Things (IoT) device, the method comprising receiving, by the IoT device and from a universal bus to which the IoT device is subscribed, a message transmitted by another IoT device to the universal bus, wherein the message is indicative of an input from a user; determining, by the IoT device, whether the IoT device is a target of a query based on the message; determining, by the IoT device, an action to be performed in response to a determination that the IoT device is the target of the query; and performing, by the IoT device and in response to the determination that the IoT device is the target of the query, the action.

Example 31 includes the subject matter of Example 30, and wherein determining the action to be performed comprises determining, based on a machine-learning-based algorithm of the IoT device, the action to be performed.

Example 32 includes the subject matter of any of Examples 30 and 31, and further including updating, by the IoT device, the machine-learning-based algorithm based on the input.

Example 33 includes the subject matter of any of Examples 30-32, and further including determining, by the IoT device and with the machine-learning-based algorithm, whether information is needed from one or more additional IoT devices for the IoT device to perform the action in response to the determination that the IoT device is the target of the query; sending, by the IoT device and in response to a determination that the information is needed from the one or more additional IoT devices, an information query to the one or more additional IoT devices; and receiving, by the IoT device and from the one or more additional IoT devices, the information, wherein determining, by the IoT device and based on the machine-learning-based algorithm, the action to be performed comprises determining, by the IoT device and based on the machine-learning-based algorithm and the information, an action to be performed.

Example 34 includes the subject matter of any of Examples 30-33, and wherein determining whether the information is needed from one or more additional IoT devices comprises determining, based on the machine-learning-based algorithm, that the information is needed from a specified IoT device, and wherein sending the query to the one or more additional IoT devices comprises sending the query with use of directed communication to the specified IoT device.

Example 35 includes the subject matter of any of Examples 30-34, and wherein sending the query to the one or more additional IoT devices comprises sending the query to the universal bus.

Example 36 includes the subject matter of any of Examples 30-35, and wherein sending the query to the universal bus comprises sending the query to each of a plurality of IoT devices to which the IoT device is directly connected, wherein the query comprises an indication that the query is intended for the universal bus.

Example 37 includes the subject matter of any of Examples 30-36, and further including updating, by the IoT device, a knowledge representation of the IoT device based on the input, wherein the knowledge representation defines information usable by the IoT device to perform the action.

Example 38 includes the subject matter of any of Examples 30-37, and wherein determining whether the IoT device is the target of the query comprises accessing a knowledge representation of the IoT device, wherein the knowledge representation defines information usable by the IoT device to perform the action.

Example 39 includes the subject matter of any of Examples 30-38, and wherein determining the action to be performed comprises accessing a knowledge representation of the IoT device, wherein the knowledge representation defines information usable by the IoT device to perform the action.

Example 40 includes the subject matter of any of Examples 30-39, and wherein performing the action comprises controlling an output device of the IoT device.

Example 41 includes the subject matter of any of Examples 30-40, and wherein the output device comprises a light, a speaker, a motor, or an actuator.

Example 42 includes the subject matter of any of Examples 30-41, and wherein receiving, by the IoT device and from the universal bus, the message indicative of the input from the user comprises receiving, by the IoT device, the message from a source IoT device directly connected to the IoT device; determining, by the IoT device, whether the message should be sent to one or more additional IoT devices different from the source IoT device and directly connected to the IoT device; and sending, by the IoT device and in response to a determination that the message should be sent to the one or more additional IoT devices, the message to the one or more additional IoT devices.

Example 43 includes the subject matter of any of Examples 30-42, and further including receiving, by the IoT device, an information query for information from an additional IoT device; determining, by the IoT device, whether the information is in a knowledge representation of the IoT device that defines the information usable by the additional IoT device to perform an additional action; determining, by the IoT device and based on a privacy setting of the IoT device, whether sharing of the information is allowed; and sending, by the IoT device and based on a determination that the information is in the knowledge representation and a determination that sharing of the information is allowed, the information to the additional IoT device.

Example 44 includes the subject matter of any of Examples 30-43, and wherein sending the information to the additional IoT device comprises encrypting the information and sending the encrypted information to the additional IoT device.

Example 45 includes the subject matter of any of Examples 30-44, and further including determining, by the IoT device, one or more directly-connected IoT devices to which the IoT device is directly connected; and subscribing the IoT to the universal bus, wherein subscribing the IoT to the universal bus comprises sending a subscription message to each of the one or more directly-connected IoT devices.

Example 46 includes the subject matter of any of Examples 30-45, and further including requesting information from each IoT device of a plurality of IoT devices subscribed to the universal bus; and receiving information from each IoT device of the plurality of IoT devices subscribed to the universal bus.

Example 47 includes the subject matter of any of Examples 30-46, and further including receiving, by the IoT device, manual configuration settings defined by the user; and configuring, by the IoT device, the IoT device based on the manual configuration settings, wherein configuring the IoT device comprises updating a knowledge representation of the IoT device based on the manual configuration settings, wherein the knowledge representation defines information usable by the IoT device to perform the action.

Example 48 includes the subject matter of any of Examples 30-47, and further including determining, by the IoT device, an administrative event indicative of an operational characteristic of the IoT device or another IoT device; updating, by the IoT device, a knowledge representation based on the administrative event, wherein the knowledge representation defines information usable by the IoT device to perform the action; and sending, by the IoT device and to the universal bus, an administrative message indicative of the administrative event.

Example 49 includes the subject matter of any of Examples 30-48, and wherein determining the administrative event comprises determining that the IoT device is not operating properly.

Example 50 includes the subject matter of any of Examples 30-49, and wherein determining the administrative event comprises determining that an additional IoT device is not operating properly.

Example 51 includes the subject matter of any of Examples 30-50, and further including receiving, by the IoT device and from the universal bus, an administrative message indicative of an operational characteristic of the IoT device or another IoT device; and updating, by the IoT device, the knowledge representation based on the administrative message, wherein the knowledge representation defines information usable by the IoT device to perform the action.

Example 52 includes the subject matter of any of Examples 30-51, and further including receiving, by the IoT device and through directed communication from an additional IoT device, an administrative message indicative of an operational characteristic of the IoT device or another IoT device; and updating, by the IoT device, the knowledge representation based on the administrative message, wherein the knowledge representation defines information usable by the IoT device to perform the action.

Example 53 includes a method for operating an Internet of Things (IoT) device, the method comprising receiving, by the IoT device and with use of an input device, a first input from a user; determining, by the IoT device and with use of a machine-learning-based algorithm, whether to (i) communicate a first message indicative of the first input with use of directed communication to one or more other IoT devices or (ii) communicate the first message to a universal bus to which the IoT device is subscribed; sending, by the IoT device and in response to a determination to communicate the first message to the universal bus, the first message to the universal bus; receiving, by the IoT device and with use of the input device, a second input from the user; determining, by the IoT device and with use of the machine-learning-based algorithm, whether to (i) communicate a second message indicative of the second input with use of directed communication to the one or more other IoT devices or (ii) communicate the message to the universal bus; and sending, by the IoT device and in response to a determination to communicate the second message with use of directed communication to the one or more other IoT devices, the second message with use of directed communication to the one or more other IoT devices.

Example 54 includes the subject matter of Example 53, and wherein the input device comprises a microphone and wherein the first input comprises captured audio data, further comprising, by the IoT device, automatic speech recognition on the captured audio data to generate transcribed speech data; and determining, by the IoT device, whether the transcribed speech data comprises a query, wherein determining whether to communicate the first message indicative of the first input with use of directed communication to one or more other IoT devices or to communicate the first message to the universal bus to which the IoT device is subscribed comprises determining, based on a determination that the transcribed speech data comprises the query, whether to communicate the first message indicative of the first input with use of directed communication to one or more other IoT devices or to communicate the first message to the universal bus to which the IoT device is subscribed.

Example 55 includes the subject matter of any of Examples 53 and 54, and wherein the input device comprises a motion sensor.

Example 56 includes the subject matter of any of Examples 53-55, and wherein the input device comprises a switch.

Example 57 includes the subject matter of any of Examples 53-56, and wherein the input device comprises a light sensor.

Example 58 includes the subject matter of any of Examples 53-57, and wherein the input device comprises a camera.

Example 59 includes one or more computer readable media comprising a plurality of instructions stored thereon that, when executed, cause an Internet of Things (IoT) device to perform the method of any of Examples 30-58.

Example 60 includes an Internet of Things (IoT) device comprising means for receiving, from a universal bus to which the IoT device is subscribed, a message transmitted by another IoT device to the universal bus, wherein the message is indicative of an input from a user; means for determining whether the IoT device is a target of a query based on the message; means for determining an action to be performed in response to a determination that the IoT device is the target of the query; and means for performing, in response to the determination that the IoT device is the target of the query, the action.

Example 61 includes the subject matter of Example 60, and wherein the means for determining the action to be performed comprises means for determining, based on a machine-learning-based algorithm of the IoT device, the action to be performed.

Example 62 includes the subject matter of any of Examples 60 and 61, and further including means for updating, by the IoT device, the machine-learning-based algorithm based on the input.

Example 63 includes the subject matter of any of Examples 60-62, and further including means for determining, with the machine-learning-based algorithm, whether information is needed from one or more additional IoT devices for the IoT device to perform the action in response to the determination that the IoT device is the target of the query; means for sending, in response to a determination that the information is needed from the one or more additional IoT devices, an information query to the one or more additional IoT devices; and means for receiving, from the one or more additional IoT devices, the information, wherein the means for determining, based on the machine-learning-based algorithm, the action to be performed comprises means for determining, based on the machine-learning-based algorithm and the information, an action to be performed.

Example 64 includes the subject matter of any of Examples 60-63, and wherein the means for determining whether the information is needed from one or more additional IoT devices comprises means for determining, based on the machine-learning-based algorithm, that the information is needed from a specified IoT device, and wherein the means for sending the query to the one or more additional IoT devices comprises means for sending the query with use of directed communication to the specified IoT device.

Example 65 includes the subject matter of any of Examples 60-64, and wherein the means for sending the query to the one or more additional IoT devices comprises means for sending the query to the universal bus.

Example 66 includes the subject matter of any of Examples 60-65, and wherein the means for sending the query to the universal bus comprises means for sending the query to each of a plurality of IoT devices to which the IoT device is directly connected, wherein the query comprises an indication that the query is intended for the universal bus.

Example 67 includes the subject matter of any of Examples 60-66, and further including means for updating a knowledge representation of the IoT device based on the input, wherein the knowledge representation defines information usable by the IoT device to perform the action.

Example 68 includes the subject matter of any of Examples 60-67, and wherein the means for determining whether the IoT device is the target of the query comprises means for accessing a knowledge representation of the IoT device, wherein the knowledge representation defines information usable by the IoT device to perform the action.

Example 69 includes the subject matter of any of Examples 60-68, and wherein the means for determining the action to be performed comprises means for accessing a knowledge representation of the IoT device, wherein the knowledge representation defines information usable by the IoT device to perform the action.

Example 70 includes the subject matter of any of Examples 60-69, and wherein the means for performing the action comprises means for controlling an output device of the IoT device.

Example 71 includes the subject matter of any of Examples 60-70, and wherein the output device comprises a light, a speaker, a motor, or an actuator.

Example 72 includes the subject matter of any of Examples 60-71, and wherein the means for receiving, from the universal bus, the message indicative of the input from the user comprises means for receiving the message from a source IoT device directly connected to the IoT device; means for determining whether the message should be sent to one or more additional IoT devices different from the source IoT device and directly connected to the IoT device; and means for sending, in response to a determination that the message should be sent to the one or more additional IoT devices, the message to the one or more additional IoT devices.

Example 73 includes the subject matter of any of Examples 60-72, and further including means for receiving an information query for information from an additional IoT device; means for determining whether the information is in a knowledge representation of the IoT device that defines the information usable by the additional IoT device to perform an additional action; means for determining, based on a privacy setting of the IoT device, whether sharing of the information is allowed; and means for sending, based on a determination that the information is in the knowledge representation and a determination that sharing of the information is allowed, the information to the additional IoT device.

Example 74 includes the subject matter of any of Examples 60-73, and wherein the means for sending the information to the additional IoT device comprises means for encrypting the information and sending the encrypted information to the additional IoT device.

Example 75 includes the subject matter of any of Examples 60-74, and further including means for determining one or more directly-connected IoT devices to which the IoT device is directly connected; and means for subscribing the IoT to the universal bus, wherein the means for subscribing the IoT to the universal bus comprises means for sending a subscription message to each of the one or more directly-connected IoT devices.

Example 76 includes the subject matter of any of Examples 60-75, and further including means for requesting information from each IoT device of a plurality of IoT devices subscribed to the universal bus; and means for receiving information from each IoT device of the plurality of IoT devices subscribed to the universal bus.

Example 77 includes the subject matter of any of Examples 60-76, and further including means for receiving manual configuration settings defined by the user; and means for configuring the IoT device based on the manual configuration settings, wherein the means for configuring the IoT device comprises means for updating a knowledge representation of the IoT device based on the manual configuration settings, wherein the knowledge representation defines information usable by the IoT device to perform the action.

Example 78 includes the subject matter of any of Examples 60-77, and further including means for determining an administrative event indicative of an operational characteristic of the IoT device or another IoT device; means for updating a knowledge representation based on the administrative event, wherein the knowledge representation defines information usable by the IoT device to perform the action; and means for sending, to the universal bus, an administrative message indicative of the administrative event.

Example 79 includes the subject matter of any of Examples 60-78, and wherein the means for determining the administrative event comprises means for determining that the IoT device is not operating properly.

Example 80 includes the subject matter of any of Examples 60-79, and wherein the means for determining the administrative event comprises means for determining that an additional IoT device is not operating properly.

Example 81 includes the subject matter of any of Examples 60-80, and further including means for receiving, from the universal bus, an administrative message indicative of an operational characteristic of the IoT device or another IoT device; and means for updating the knowledge representation based on the administrative message, wherein the knowledge representation defines information usable by the IoT device to perform the action.

Example 82 includes the subject matter of any of Examples 60-81, and further including means for receiving, through directed communication from an additional IoT device, an administrative message indicative of an operational characteristic of the IoT device or another IoT device; and means for updating the knowledge representation based on the administrative message, wherein the knowledge representation defines information usable by the IoT device to perform the action.

Example 83 includes an Internet of Things (IoT) device comprising means for receiving, with use of an input device, a first input from a user; means for determining, with use of a machine-learning-based algorithm, whether to (i) communicate a first message indicative of the first input with use of directed communication to one or more other IoT devices or (ii) communicate the first message to a universal bus to which the IoT device is subscribed; means for sending, in response to a determination to communicate the first message to the universal bus, the first message to the universal bus; means for receiving, with use of the input device, a second input from the user; means for determining, with use of the machine-learning-based algorithm, whether to (i) communicate a second message indicative of the second input with use of directed communication to the one or more other IoT devices or (ii) communicate the message to the universal bus; and means for sending, in response to a determination to communicate the second message with use of directed communication to the one or more other IoT devices, the second message with use of directed communication to the one or more other IoT devices.

Example 84 includes the subject matter of Example 83, and wherein the input device comprises a microphone and wherein the first input comprises captured audio data, further comprising means for performing automatic speech recognition on the captured audio data to generate transcribed speech data; and means for determining whether the transcribed speech data comprises a query, wherein the means for determining whether to communicate the first message indicative of the first input with use of directed communication to one or more other IoT devices or to communicate the first message to the universal bus to which the IoT device is subscribed comprises means for determining, based on a determination that the transcribed speech data comprises the query, whether to communicate the first message indicative of the first input with use of directed communication to one or more other IoT devices or to communicate the first message to the universal bus to which the IoT device is subscribed.

Example 85 includes the subject matter of any of Examples 83 and 84, and wherein the input device comprises a motion sensor.

Example 86 includes the subject matter of any of Examples 83-85, and wherein the input device comprises a switch.

Example 87 includes the subject matter of any of Examples 83-86, and wherein the input device comprises a light sensor.

Example 88 includes the subject matter of any of Examples 83-87, and wherein the input device comprises a camera.

The invention claimed is:

1. A first Internet of Things (IoT) device comprising:
memory; and
a processor to:
  determine if a pattern is recognized in an input from a user;
  in response to a determination that the pattern is not recognized in the input, communicate a first message indicative of the input over a universal bus; and
  in response to a determination that the pattern is recognized in the input:
    determine if the first IoT device is to perform an action based on the pattern;
    cause the first IoT device to perform the action to change a physical environment based on a determination from the pattern recognized in the input that the first IoT device is to perform the action;
    determine if additional information is needed for a second IoT device to perform the action;
    communicate a second message indicative of the input directly to a second IoT device without using the universal bus based on a determination that the first IoT device is not to perform the action and that additional information is not needed to cause the second IoT device to perform the action; and
    in response to a determination that additional information is needed for the second IoT device to perform the action, communicate a third message over the universal bus to a third IoT device to request the additional information to prompt the third IoT device to send a fourth message to at least one of the first IoT device or the second IoT device based on a privacy setting.

2. The first IoT device of claim 1, further including an input device to receive the input from the user, the input device including a microphone, the input including audio data, the processor to:
  determine whether the audio data includes a query, and
  in response to a determination that the audio data includes a query, communicate the first message over the universal bus.

3. The first IoT device of claim 1, further including an input device to receive the input from the user, the input device including a motion sensor.

4. The first IoT device of claim 1, further including an input device to receive the input from the user, the input device including a light sensor.

5. The first IoT device of claim 1, further including an input device to receive the input from the user, the input device including a camera.

6. The first IoT device of claim 1, further including:
  an input device to receive the input from the user, the input device including a microphone, the input including audio data, the processor is to:
    determine whether the audio data includes a query;
    determine whether the first IoT device is a target of the query; and
    determine the action to be performed in response to a determination that the first IoT device is the target of the query; and
  an actuator to perform, in response to the determination that the first IoT device is the target of the query, the action.

7. The first IoT device of claim 6, wherein the actuator is to control one or more of a light, a speaker, or a motor.

8. The first IoT device of claim 1, wherein the processor is to:
  determine an administrative event indicative of an operational characteristic of the first IoT device or another IoT device; and
  send, to the universal bus, an administrative message indicative of the administrative event.

9. The first IoT device of claim 8, wherein the administrative event is an indication that the first IoT device or the another IoT device is not operating properly.

10. A storage device or storage disk comprising instructions that, when executed, cause a first Internet of Things (IoT) device to at least:
  determine if a pattern is recognized in an input received from a user;
  in response to a determination that the pattern is not recognized in the input, communicate a first message indicative of the input over a universal bus; and
  in response to a determination that the pattern is recognized in the input:
    determine if the first IoT device is to perform an action based on the pattern;
    cause the first IoT device to perform the action to change a physical environment based on the determination from the pattern recognized in the input that the first IoT device is to perform the action;
    determine if additional information is needed for a second IoT device to perform the action;
    communicate a second message indicative of the input directly to a second IoT device without using the universal bus based on a determination that the first IoT device is not to perform the action and that additional information is not needed to cause the second IoT device to perform the action; and
    in response to a determination that additional information is needed for the second IoT device to perform the action, communicate a third message over the universal bus to a third IoT device to request the additional information to prompt the third IoT device to send a fourth message to at least one of the first IoT device or the second IoT device based on a privacy setting.

11. The storage device or storage disk of claim 10, wherein the input includes audio data, and the instructions, when executed, further cause the first IoT device to:
  determine whether the audio data includes a query; and
  in response to a determination that the audio data includes a query, communicate the first message over the universal bus.

12. The storage device or storage disk of claim 10, wherein the input includes audio data, and the instructions, when executed, further cause the first IoT device to:
  determine whether the audio data includes a query;
  determine whether the first IoT device is a target of the query;
  determine the action to be performed in response to a determination that the first IoT device is the target of the query; and perform, in response to the determination that the first IoT device is the target of the query, the action.

13. The storage device or storage disk of claim 12, wherein the action includes control of one or more of a light, a speaker, or a motor.

14. The storage device or storage disk of claim 10, wherein the instructions, when executed, further cause the first IoT device to:
   determine an administrative event indicative of an operational characteristic of the first IoT device or another IoT device; and
   send, to the universal bus, an administrative message indicative of the administrative event.

15. The storage device or storage disk of claim 14, wherein the administrative event is an indication that the first IoT device or the another IoT device is not operating properly.

16. A first Internet of Things (IoT) device comprising:
   means for processing an input received from a user, the processing means to:
      determine if a pattern is recognized in the input;
      determine whether the first IoT device is to perform an action based on the pattern recognized in the input; and
      determine if additional information is needed for a second IoT device to perform the action;
   means for communicating to:
      communicate a first message indicative of the input over a universal bus in response to a determination that the pattern is not recognized in the input;
      communicate a second message indicative of the input directly to a second IoT device without using the universal bus in response to a determination that the pattern is recognized in the input and based on a determination that the first IoT device is not to perform the action and that additional information is not needed, the second message to cause the second IoT device to perform the action; and
      communicate, in response to a determination that additional information is needed for the second IoT device to perform the action, a third message over the universal bus to a third IoT device to request the additional information and to prompt the third IoT device to send a fourth message to at least one of the first IoT device or the second IoT device based on a privacy setting; and
   means for performing the action by the first IoT device to change a physical environment based on the determination from the pattern recognized in the input that the first IoT device is to perform the action.

17. The first IoT device of claim 16, wherein the processing means is to:
   determine whether the input includes a query;
   determine whether the first IoT device is a target of the query; and
   determine the action to be performed in response to a determination that the first IoT device is the target of the query.

18. The apparatus of claim 1, wherein the privacy setting defines a type of information that can be shared with one or more of the first IoT device, second IoT device, or third IoT device.

19. The apparatus of claim 1, wherein the privacy setting indicates if sharing of information is allowed with one or more of the first IoT device, second IoT device, or third IoT device.

* * * * *